W. P. KRAUSE.
SPLIT PATTERN MOLDING MACHINE.
APPLICATION FILED APR. 12, 1917.

1,316,166.

Patented Sept. 16, 1919.
5 SHEETS—SHEET 2.

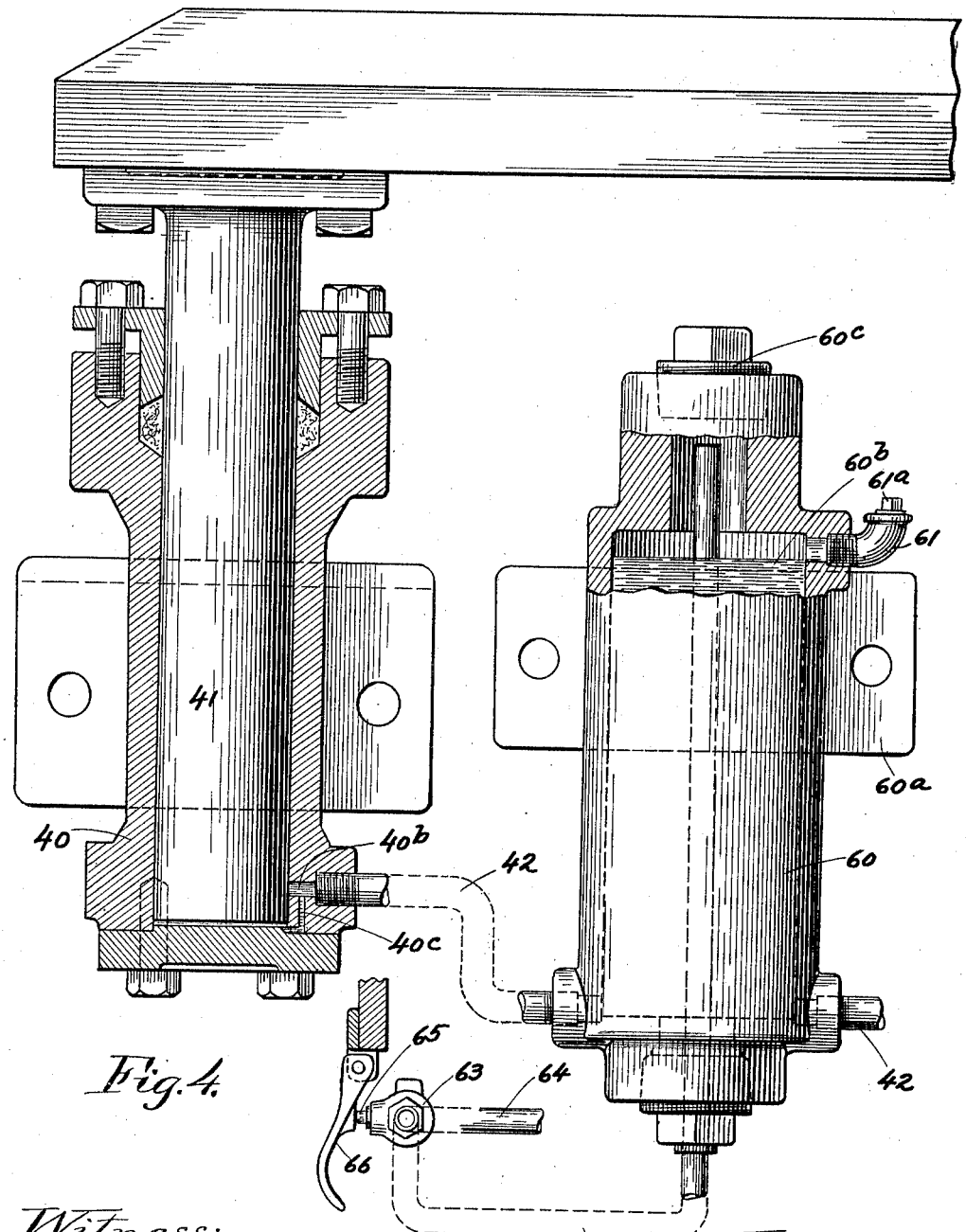

W. P. KRAUSE.
SPLIT PATTERN MOLDING MACHINE.
APPLICATION FILED APR. 12, 1917.
1,316,166.
Patented Sept. 16, 1919.
5 SHEETS—SHEET 5.
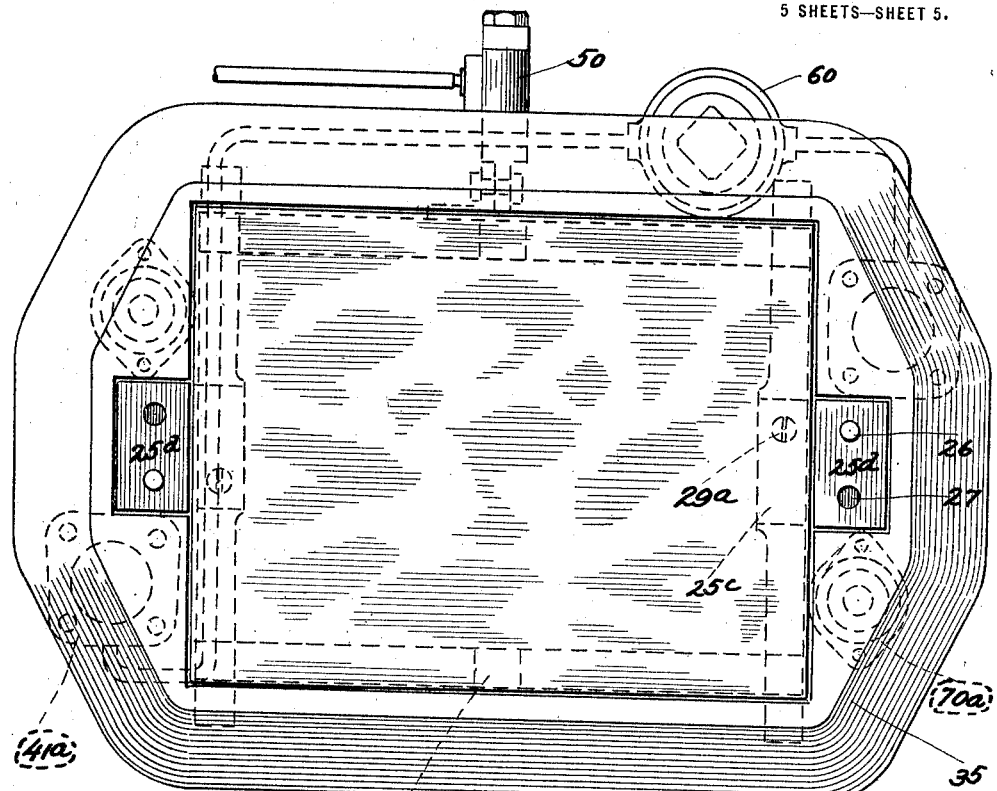
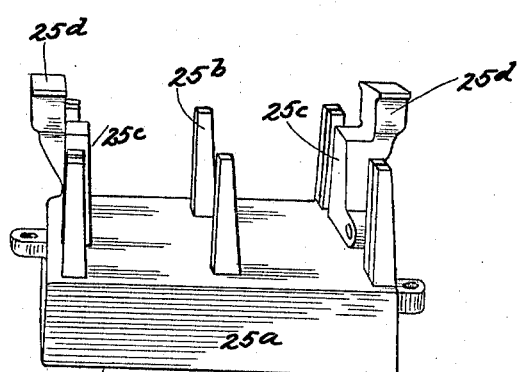
Witness:
C. C. Burnap
Inventor:
By William P. Krause
Sheridan, Wilkinson & Scott, Att'ys

UNITED STATES PATENT OFFICE.

WILLIAM P. KRAUSE, OF CHICAGO, ILLINOIS, ASSIGNOR TO MUMFORD MOLDING MACHINE COMPANY, OF JERSEY CITY, NEW JERSEY, A CORPORATION OF NEW JERSEY.

SPLIT-PATTERN MOLDING-MACHINE.

1,316,166.   Specification of Letters Patent.   Patented Sept. 16, 1919.

Application filed April 12, 1917. Serial No. 161,514.

*To all whom it may concern:*

Be it known that I, WILLIAM P. KRAUSE, a citizen of the United States, residing at Chicago, in the county of Cook and State of Illinois, have invented certain new and useful Improvements in Split-Pattern Molding-Machines, of which the following is a specification.

This invention relates to improvements in split pattern molding machines and has for its principal object to provide in conjunction with such a machine new and improved means for lifting the flask frame and flask.

Another object consists in providing a new and improved valve-controlled means for the control of said flask-lifting device. These and other objects will be more fully set forth and described in the following specification and shown in the accompanying drawings, in which—

Fig. 4 is a detail partially in section of one of the lifting guide cylinders and plungers and the main hydraulic reservoir.

Fig. 5 is a plan view of the flask frame, pattern plate, and allied construction; and Fig. 6 is a perspective of the ramming-head construction.

Figure 2:
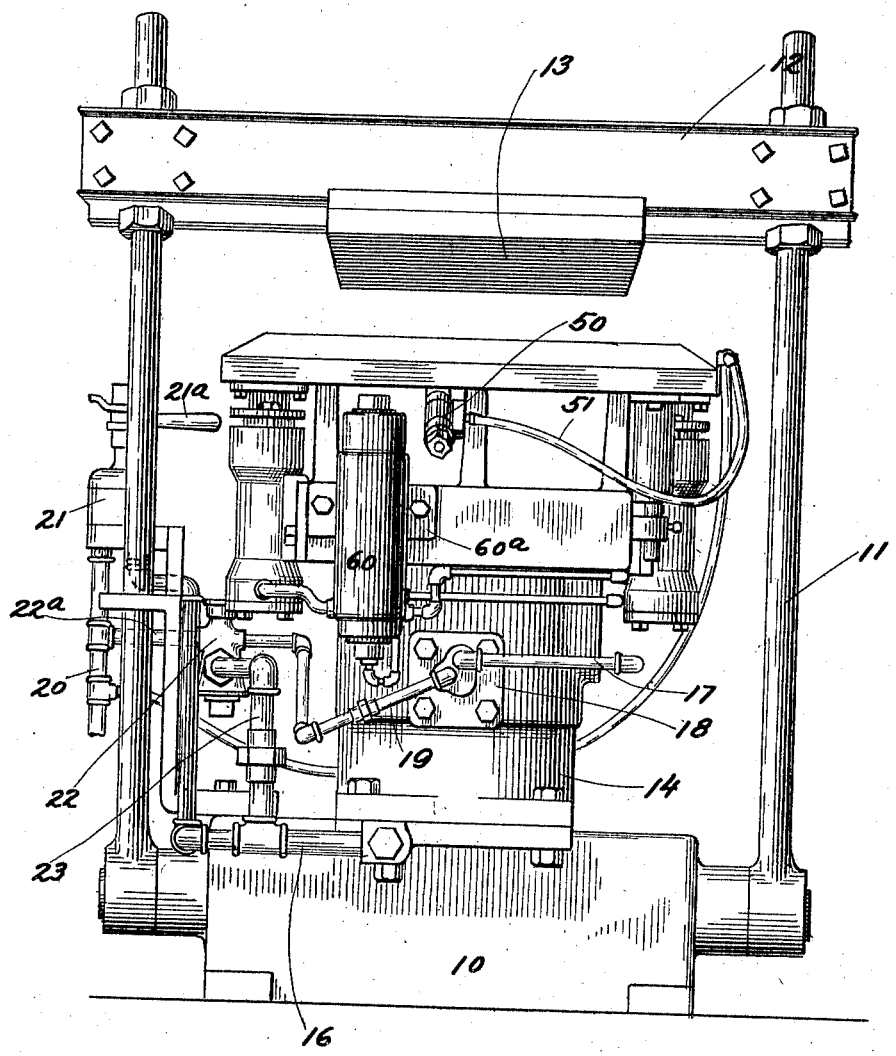
Fig. 2 is a rear elevation of the same.
Figure 3:
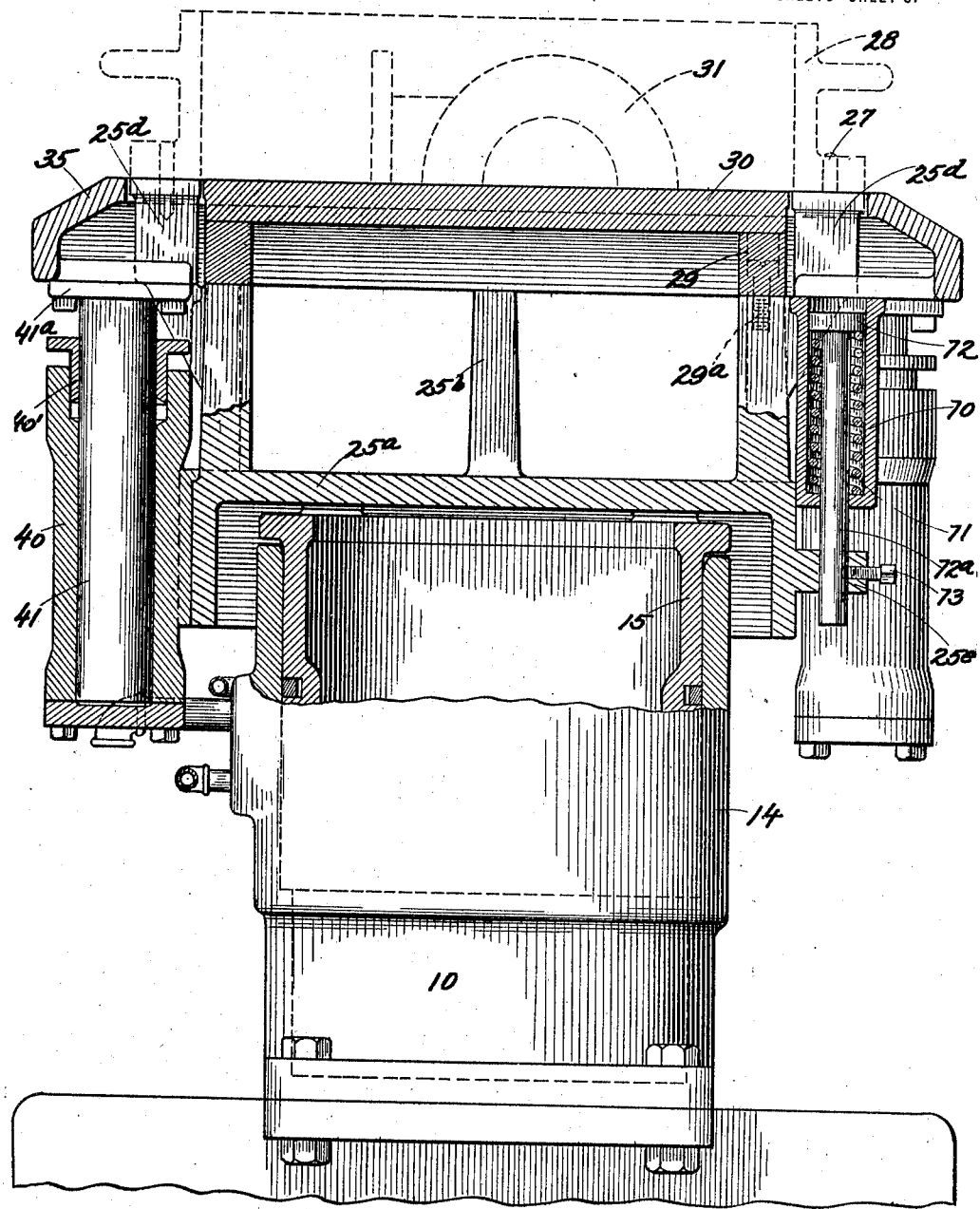
Fig. 3 is a transverse vertical section through a portion of the machine, the position of a flask and pattern being indicated in dotted lines.

Like numerals refer to like elements throughout the drawings, in which 10 indicates, generally, the base of my machine, having the yoke arms 11 pivotally attached thereto carrying a crosshead 12 and squeezer head 13. The cylinder 14 is supported upon and attached to the base 10 and projects upwardly therefrom, a coacting plunger 15 being reciprocably mounted therein, as indicated in Fig. 3. The previously described mechanism forms no part of my invention and represents only a general construction herein. It will suffice to say that the cylinder 14 is of compound construction as is the plunger 15, as indicated in full and dotted lines in Fig. 3. In the operation of this specific machine, actuating fluid is admitted beneath the plunger 15 to the bottom of the cylinder 14 from the duct 16 for squeezing operation, and air is admitted to the upper portion of the cylinder 14 beneath the enlarged corresponding portion of the plunger 15 from a duct 17 leading from a suitable jolt-ramming valve generally indicated by numeral 18 and exteriorly viewed and shown in Fig. 2. The actuating fluid for jolting is admitted to the valve 18 from duct or pipe 19, the operation and construction of the jolt-ramming valve needing no further mention herein.

Figure 1:
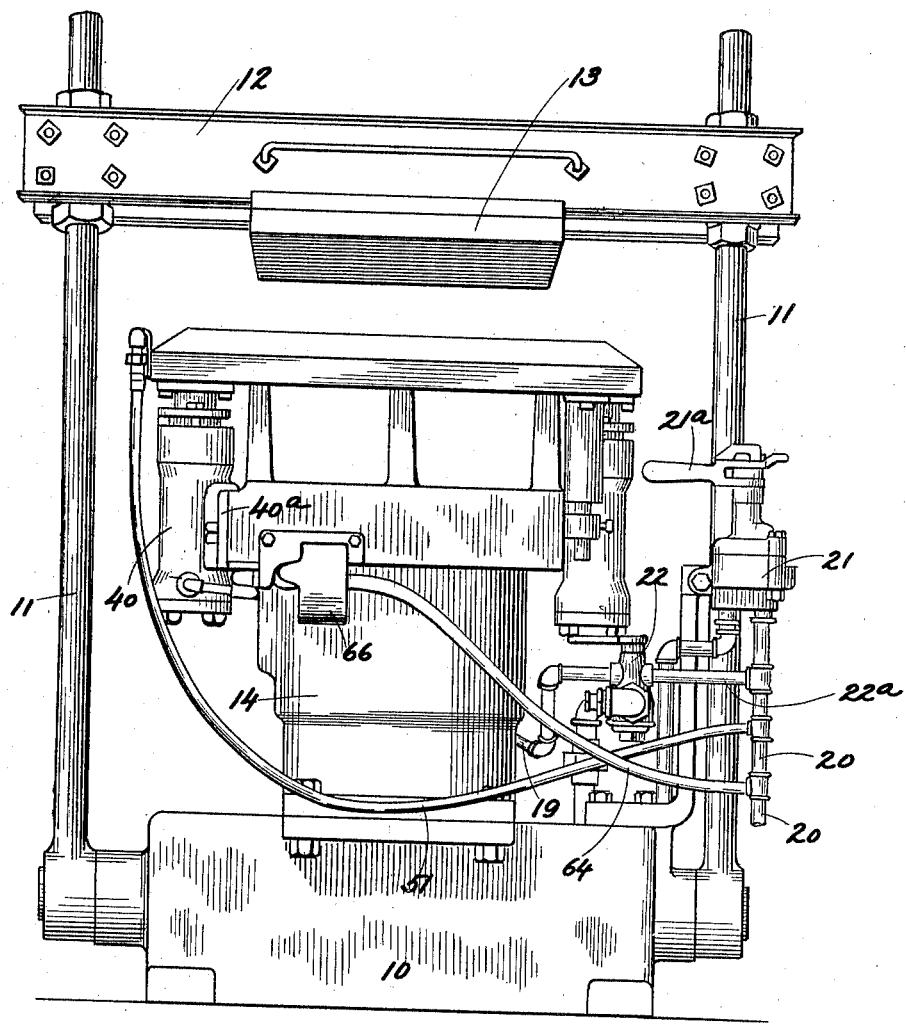
Figure 1 is a front elevation of a machine embodying my invention.

To supply actuating fluid, such as air, under pressure for the squeezing and jolt-ramming operations of the machine, I provide a main supply duct 20 (see Fig. 1) feeding to the engineer's valve 21, the same having an operating handle 21ª for suitable manual actuation. The actuating fluid for squeezing, upon proper manipulation of the valve handle 21ª, is supplied and exhausted through the duct 16 previously mentioned. A manually operable valve, generally indicated by numeral 22, is provided to control the supply of actuating fluid from duct 20, through a duct or pipe 22ª to the supply duct 19 which leads from the valve 22. An auxiliary duct or pipe 23 extends between the valve 22 and squeezing fluid duct 16, as shown in Fig. 2, and flow therethrough is so controlled by valve 22 as to be permitted from beneath the squeezing portion of the plunger when the valve 22 is in position to permit supply of the jolt actuation fluid through duct 19, this auxiliary duct 23 being provided to permit flow of air to and from beneath the squeezing portion of the plunger 15 to prevent the formation of vacuum or compression therein during the actuation of the jolt-ramming mechanism; this feature also not being a portion of this invention but being generally described merely to further understand the functioning of the machine.

A ramming head 25 is provided (see Fig. 6), the same comprising a base portion 25ª constructed and arranged to rest upon and be attached to the upper portion of plunger 15, see Fig. 3. Extending upwardly from the base 25ª are the ramming head posts 25ᵇ and the vibrator frame pedestals 25ᶜ, the latter being provided with lugs 25ᵈ in each of which when fully assembled are provided the upwardly projecting flask-engaging pins 26 and flask pin holes 27 for suitable engagement of half-flasks (see Fig. 5), one of which is indicated in dotted lines in Fig. 3, and designated by numeral 28. The vibrator frame 29 is attached to the vibrator frame pedestals 25ᶜ by stud bolts 29ᵃ to permit the slight amount of play necessary for vibration, and when the machine is assembled pattern plate 30 is secured by screws, dowels, or the like upon this vibrator frame 29, pattern plate 30 in Fig. 3 being shown in dotted lines as carrying a half pattern 31. When assembled, the upper surface of the pattern plate 30 lies flush with the upper surface of the lugs 25ᵈ as shown in Fig. 3.

It will be apparent that in the operation of the machine so far as described, when the plunger 15 is actuated for jolt ramming the flask 28, pattern plate 30, together with the pattern carried thereby will be jolted until the supply of actuating fluid is cut off by valve 22; this operation, of course, taking place after the filling of the half-flask 28 with molding sand. As a final step in the effecting of the molding operation, it is generally advisable to squeeze the sand in the flask, and to attain this end squeezing fluid is supplied beneath plunger 15 to raise the same and its load, including the flask and ramming head, until the presser-head 13 is forced into contact with the sand to properly squeeze the same, after which the plunger is allowed to drop to the position shown in Fig. 3.

After the jolting and squeezing has taken place, it is necessary to draw the pattern from the sand and flask, and for this purpose a flask-supporting and lifting frame 35 is provided, see Fig. 5 for example, this frame being recessed or cut away to fit around the lugs 25ᵈ so that the half flask 28 will rest and be partially supported upon this frame 35 save for the portion which rests upon the lugs 25ᵈ. When it is desired to draw the pattern, the frame 35 is raised independently of and relative to the ramming head structure through the medium of a pair of guide cylinders 40 which are bolted by means of suitable flanges 40ᵃ to the base of the ramming head, as shown in Fig. 1, at each end of the latter. Each of these guide cylinders 40 is provided with a plunger or piston 41 reciprocably mounted therein and projecting through suitable glands or stuffing boxes 40′ at the top of the cylinder, see Fig. 3, for example. These plungers 41 are flanged at their upper ends as indicated by 41ᵃ, and such flanges are suitably bolted or otherwise secured to the bottom of the frame 35. Each of these cylinders 40 is provided with a main fluid inlet 40ᵇ above the bottom thereof, a supply duct 42 leading to the inlet 40ᵇ in each of the cylinders 40. As will be seen from a scrutiny of Fig. 4, the plunger 41 fitting closely in the cylinder 40 and resting adjacent the bottom thereof, a slight clearance being preferably left at the bottom, the position of such plunger when at its lowermost position would serve to cut off the supply of actuating fluid through the inlet 40ᵇ. This would normally make the device inoperative, and to overcome such a result I provide the bleed or restricted passage 40ᶜ leading from the duct or passage 40ᵇ to communicate with the bottom of the cylinder 40. The purpose of this construction is to provide what is in effect a two-stage power lift. In present day practice it is customary, in drawing the pattern from the mold, to provide what is known as a hand starting device, actuation of which by the molder serves to manually lift or start the flask from the pattern, during which movement vibration of the pattern plate is taking place. Hitherto, to the best of my knowledge, it has always been necessary for efficient molding to provide hand starting means for the first stage lift, after which hydraulic or other power has been applied to complete the lifting. The reason for this has been that were the hydraulic or other power applied in full force the lift would be too sudden, and in many instances sand would cling to the pattern owing to the fact that the vibrator would not have had sufficient time to loosen any such clinging portions from the pattern. In the actuation of my device, when the actuating fluid, such as oil, or the like, is forced through supply duct 42 its admission to the cylinder 40 beneath the plunger 41 is restricted and the effective force thereof is reduced by having to pass through the bleed or restricted passage 40ᶜ. This bleed passage having been constructed of proper size the effect will be to so reduce the effective force of the actuating fluid that a gentle or slow rise is imparted to the plunger 41 until the inlet 40ᵇ is uncovered by the plunger, at which time full effective force of the actuating fluid actuates the plunger 41 and the resultant rise thereof is more rapid and quick. This operation results in the necessary two-stage lift of the flask during the drawing of the pattern. At the same time, both stages of the lifting or drawing are produced mechanically or hydraulically in contra-distinction to the manual accomplishment of the first stage lift in present day construction and subsequent hydraulic lift or second stage. During the first lift, as stated above, it is advisable to vibrate the pattern plate, and for this purpose I have shown a vibrator 50 attached to the under side of the vibrator frame 29, this vibrator being provided with actuating fluid such as air through the tube 51 in communication with the fluid supply duct 20. To secure proper simultaneous actuation of the two plungers, I provide a reservoir 60 bolted through the medium of a flange 60$^a$ to the base of the ramming head, see Figs. 2 and 4, for example. This reservoir contains the supply of fluid such as oil or the like as indicated by numeral 60$^b$, see Fig. 4, a street L 61 being threaded into engagement with the reservoir adjacent the top thereof to permit replenishing of the supply of fluid as necessary, this L being provided with a filler cap or plug 61$^a$, see Fig. 4. A fluid supply duct 62 projects upwardly through the bottom of the reservoir 60 and terminates in an open end at the top of the reservoir 60 above the surface of the liquid 60$^b$ just beneath the threaded plug 60$^c$. This duct or pipe 62 leads from the valve casing 63 in which is provided a suitable duct furnishing communication between the duct 62 and the supply duct 64 leading from the main air supply 20, see Figs. 1 and 4. A valve, closed by a spring or the like not shown, normally prevents communication between the pipes or ducts 64 and 62. This valve is provided with a projecting stem 65 lying adjacent the hinged or pivoted flap 66 depending from the ramming head base and operable or engageable by the knee of the molder to depress the valve stem 65 to permit flow of air or other fluid from duct 64 through duct 62 into the reservoir 60 at the top thereof, whereupon the liquid 60$^b$ will be expelled or driven out through the ducts 42 which lead from the bottom of the reservoir 60 to the cylinders 40.

It will be apparent that when the molder is ready to lift the flask or draw the pattern, he may set the vibrator going and seize the handle of the half-flask with both hands and depress the flap 66 to actuate valve stem 65 to lift the plungers 41, whereupon the supporting frame 35 will be raised relative to the ramming head, pattern plate, etc., in the two-stage movement described above until the flask and mold is lifted clear of the pattern 31, when the molder may lift the flask and mold from the frame allowing the valve stem 65 to move to closed position by removing his knee from the flap 66, whereupon the weight of the supporting frame 35, plungers, etc., will result in the same dropping to rest or normal position, forcing the actuating liquid back into the reservoir 60; the final movement to rest of the plungers being slowed down or decreased due to the restriction of flow of the fluid back through the ducts 40$^c$ as will be obvious.

By this valve control it will be clear that my construction enables the operator to utilize both hands for the grasping of the flask during the lifting thereof, a meritorious feature of this invention.

To dampen or partially check this lifting motion to prevent a jarring of the mold as the same approaches its upper limit of travel, I provide cylinders 70 provided with flanges 70$^a$ at their upper end, see Fig. 5, these flanges being bolted to the underside of the frame 35, one cylinder 70 being located at each end of the frame preferably. Located in each of these cylinders 70 is a coil spring 71 coiled around the stems or shanks 72$^a$ of the pistons 72 beneath the head thereof, said coil springs 71 also coacting with the bottom of the cylinders 70. The stems 72$^a$ of these plungers 72 are adjustably secured in the apertured lugs 25$^e$ projecting outwardly from the base of the ramming head 25 through the medium of set screws 73. It will be obvious that the lifting of the frame 35 will be partially resisted and checked by the coaction between the pistons 72, springs 71, and cylinders 70, this resistance increasing as the frame 35 moves upwardly farther from the lowermost or rest position. By means of set screws 73 the pistons 72 may be adjusted for patterns of different heights.

It is believed that the description of the operation of the mechanism described above needs no further amplification to render it clear to those skilled in the art.

It will be apparent that my invention is susceptible of many modifications and improvements, and I do not wish to be restricted to the form shown and described beyond the scope of the appended claims.

What I claim is:

1. In a molding machine in combination, a flask supporting frame, means to lift said frame, said means comprising a cylinder, a plunger reciprocably mounted therein, a liquid containing reservoir, a duct leading from said reservoir to said cylinder and operable to transmit fluid from the former to the latter, means to force said flow of fluid, said means comprising a fluid supply duct constructed and arranged to supply actuating fluid to said reservoir, means to control said last-named fluid supply, said means comprising a valve in said fluid supply normally closing the same, and means to open said valve, said means comprising an actuating member constructed and arranged for actuation by the knee of an operator.

2. In a molding machine, in combination, a flask frame, fluid actuating means to lift said frame, said means comprising fluid actuated members, a fluid supply duct, a valve normally closing said duct, and means coacting with said valve for actuation by the knee or the like of an operator, said last-named means comprising a hinged flap member.

3. In a molding machine, in combination, a flask frame, fluid actuating means to lift said frame, said means comprising fluid actuated members, a fluid supply duct, a valve normally closing said duct, said valve being provided with a projecting portion, and a hinged flap operable by the knee of the operator to contact with said valve portion and move said valve to open position.

In testimony whereof, I have subscribed my name.

WILLIAM P. KRAUSE.

Witnesses:
F. C. HEINEMANN,
R. H. WOODLAND.

Copies of this patent may be obtained for five cents each, by addressing the "Commissioner of Patents, Washington, D. C."